United States Patent [19]

Asakura et al.

[11] Patent Number: 5,703,179
[45] Date of Patent: Dec. 30, 1997

[54] METHOD FOR PRODUCING POLYESTERS

[75] Inventors: Ryosuke Asakura, Chita; Hirohito Nagaiwa, Nagoya; Masashige Murakami, Ohgaki, all of Japan

[73] Assignee: Toray Industries, Inc., Japan

[21] Appl. No.: 694,108

[22] Filed: Aug. 8, 1996

[30] Foreign Application Priority Data

Aug. 28, 1995 [JP] Japan .................. 7-219196

[51] Int. Cl.⁶ .................. C08G 63/02; C08F 2/00
[52] U.S. Cl. .................. 526/59; 528/176; 528/271; 528/272
[58] Field of Search .................. 526/59; 528/176, 528/271, 272

[56] References Cited

U.S. PATENT DOCUMENTS 4,153,766  5/1979  Koide et al. .................. 526/59
5,151,474  9/1992  Lange et al. .................. 526/60

FOREIGN PATENT DOCUMENTS

| 0 434 925 A2 | 7/1991 | European Pat. Off. . |
| 0 434 925 A3 | 7/1991 | European Pat. Off. . |
| 222 034 | 5/1985 | German Dem. Rep. . |
| 2 386 572 | 11/1978 | Japan . |
| 53-126096 | 11/1978 | Japan . |
| 59 048 058 | 11/1984 | Japan . |
| 1071840 | 3/1989 | Japan . |
| 1 608 183 | 11/1990 | U.S.S.R. . |
| 1 810 811 | 4/1993 | U.S.S.R. . |
| 2 184 129 | 6/1987 | United Kingdom . |

*Primary Examiner*—Terressa Mosley
*Attorney, Agent, or Firm*—Austin R. Miller

[57]  ABSTRACT

Method for producing polyesters by measuring the content of at least one of water, glycol and its ester-forming derivative in the distillate to be recycled, determining the amounts of the raw materials to be fed to the intended reaction device, on the basis of the data thus measured, and feeding stabilized amounts of recycle to the reaction device.

6 Claims, 3 Drawing Sheets

METHOD FOR PRODUCING POLYESTERS

BACKGROUND OF THE INVENTION

The present invention relates to a method for producing polyesters, in which the amounts of terephthalic acid (hereinafter referred to as TPA) and/or its ester-forming derivative, and of a glycol, such as ethylene glycol (hereinafter referred to as EG), and 1,4-butanediol (hereinafter referred to as BG), and/or its ester-forming derivative are minimized while the quality of the polyester produced is stabilized.

A polyester, for example, polyethylene terephthalate is produced by forming a slurry of TPA and EG in a slurry mixer, transferring the slurry to an esterification device where TPA and EG are esterified to give an oligomeric polyester, and then transferring the oligomeric polyester to a polycondensation device where it is subjected to polycondensation.

In order to improve the reactivity in this process, in general, from 1.05 to 1.5 molar times of proportion of EG, relative to TPA, must be fed into the slurry mixer. In addition, the solvents for the reaction catalysts and the additives to be used in the reactions mostly comprise EG. Therefore, an excess of EG over the theoretical EG amount exists in the process. As a result, it is necessary to partly remove EG through distillation from the esterification device and the polycondensation device, and EG thus removed (hereinafter referred to as "EG distillate") contains water as well as the oligomeric polyester formed that shall be in the form of an azeotropic mixture with the oligomer or in the form of scattering particles that follow the oligomer.

In general, a polyester plant is provided with a recovery device where the EG distillate and also EG to be added to the process are purified collectively into EG with high purity, and the high-purity EG is recycled in the process. However, the recovery cannot be 100%. In total, the amount of EG to be used is large, resulting in an increase in the cost of the product. The substance to be removed from the EG distillate by purifying it to recover pure EG includes essentially low-boiling-point components such as water and also high-boiling-point components such as the oligomeric polyester, catalysts and additives. In particular, however, the disposal of the latter as waste causes a great increase in the amounts of TPA, EG, catalysts and additives to be used, thus also resulting in the increase in the cost of an product in total. Various studies have heretofore been made in order to remove the increase in the production costs. One is a method of directly recycling the EG distillate in the process without being purified and recovered, which is disclosed in, for example, Japanese Laid-Open Patent Application No. 53-126096 and Japanese Patent Publication No. 59-48058. The method could solve the problem of lowering the production costs. In this method, however, the EG distillate to be directly recycled still contains low-boiling-point and high-boiling-point impurities. In addition, since such impurities exist in the EG distillate at varying ratios, the molar ratio of EG/TPA in the raw material could not be kept constant with the result that the time-dependent variation in the quality of the product, polyester polymer to be produced is large. Thus, it has heretofore been impossible to solve all the problems in the prior art.

SUMMARY OF THE INVENTION

The object of the present invention is to provide a method for producing polyesters, in which the glycol distillate to be taken out in each step constituting the method is directly recycled in the method without always being purified in a purifying step of recovering a pure glycol, thereby greatly lowering the production costs, while the components of raw materials are controlled always at predetermined ratios.

Specifically, the first aspect of the present invention is a method for producing polyesters including the step of partly or wholly recycling the distillate which is taken out from the esterification device, and/or the polycondensation device and which consists essentially of a glycol and/or its ester-forming derivative, for the starting material in the method, and comprises the step of continuously or intermittently measuring the content of at least one of water, the glycol and its ester-forming derivative in the distillate to be recycled, determining the amounts of the raw materials to be fed to the intended reaction device on the basis of the data thus measured, and feeding the thus-determined amounts of such raw materials to the reaction device.

The second aspect of the present invention is a method for producing polyesters including partly or wholly recycling the distillate which is taken out from the esterification device and/or the polycondensation device and which consists essentially of a glycol and/or its ester-forming derivative, as a starting material in the method, and comprises the step of storing the distillate, prior to being recycled as a starting material, in a storage tank that has a capacity corresponding to the amount of the glycol and/or its ester-forming derivative to be fed to the esterification device for a period of 10 hours or more, and thereafter feeding the distillate comprising a glycol and/or its ester-forming derivative to the intended reaction device.

DESCRIPTION OF PREFERRED EMBODIMENTS OF THE INVENTION

The present invention is directed to the production of polyesters which are composed of TPA and/or its ester-forming derivative as the dicarboxylic acid component and a glycol, such as EG or BG, and/or its ester-forming derivative as the glycol component. Preferred are polyethylene terephthalate and polybutylene terephthalate.

A part of the TPA component may be substituted with a bi-functional carboxylic acid which includes, for example, 5-sodium-sulfoisophthalic acid, 5-potassium-sulfoisophthalic acid, p-β-hydroxyethoxybenzoic acid, p-hydroxybenzoic acid, isophthalic acid, 4,4'-diphenylsulfone-dicarboxylic acid, 4',4-diphenylmethane-dicarboxylic acid, 4',4-diphenyl ether-dicarboxylic acid, 4,4'-diphenyl-dicarboxylic acid, 1,2'-diphenoxyethane-p,p'-dicarboxylic acid, 2,6-naphthalene-dicarboxylic acid, adipic acid and sebacic acid, or its ester-forming derivative, and a part of the glycol component may be substituted with an aliphatic, alicyclic or aromatic dihydroxy compound which includes, for example, trimethylene glycol, tetramethylene glycol, hexamethylene glycol, diethylene glycol, triethylene glycol, polyethylene glycol, 1,4-cyclohexane-diol, 1,4-cyclohexane-dimethanol, 1,4-bis-β-hydroxyethoxybenzene and bisphenol A, or its ester-forming derivative, thereby giving copolyesters in which 70 mol % or more of the repeating units in the main chain are ester units selected from ethylene terephthalate units and tetramethylene phthalate units.

The method for producing polyesters of the present invention can be conducted either continuously or through batch production.

The first aspect of the present invention will be described hereinunder with reference to the drawings attached hereto. EG is referred to in the following, which, however, is not limitative.

Figure 1:
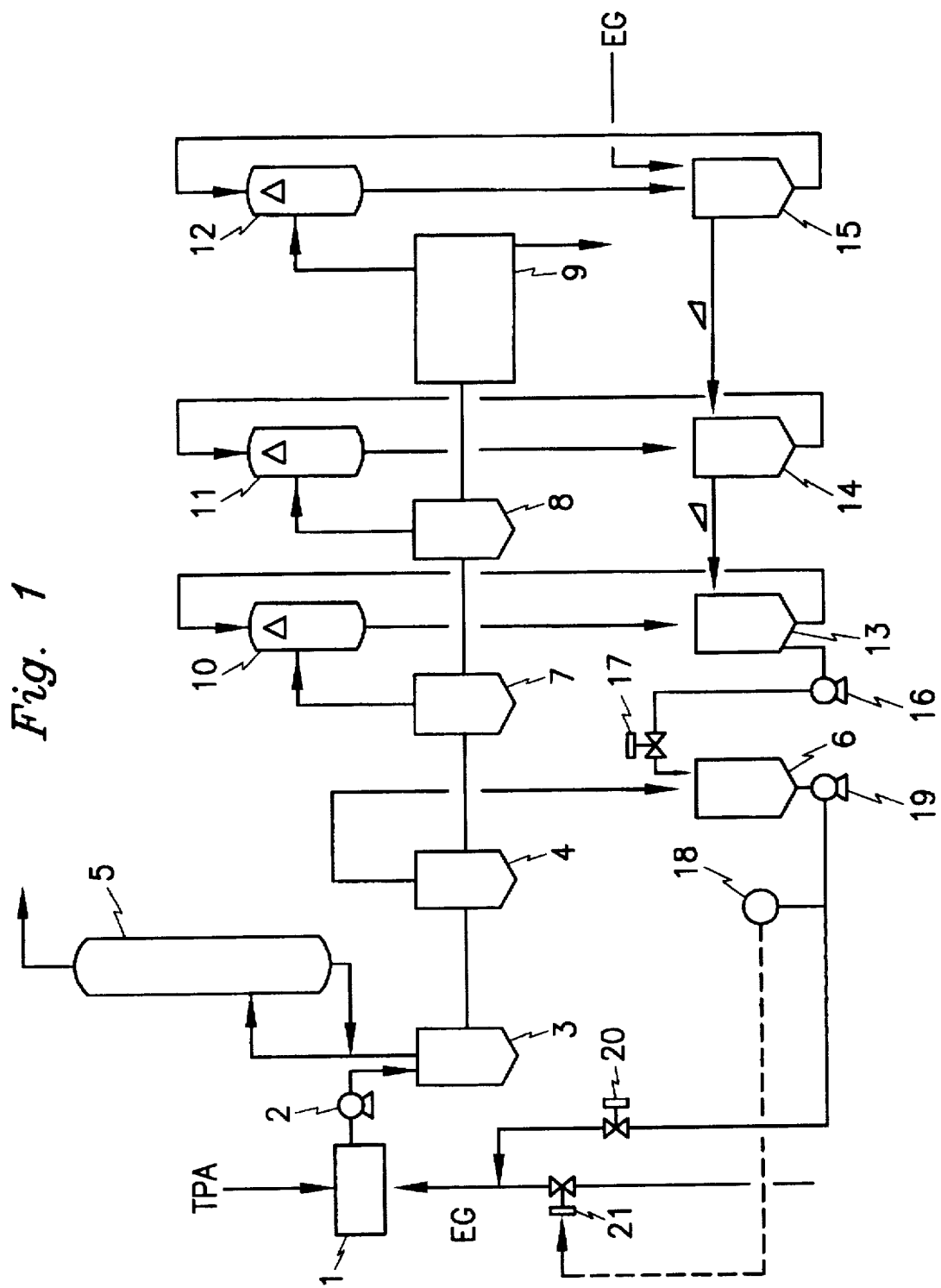
FIG. 1 is a schematic outline of one embodiment of the present invention to produce a polyester.

FIG. 1 is a schematic view showing one embodiment of the first aspect of the present invention. In FIG. 1, TPA and EG are fed to a slurry mixer 1 in a predetermined molar ratio, in which they are formed into a slurry. The slurry is used as the starting material and transferred to an esterification device 3 via a pump 2. In the method as illustrated in FIG. 1, TPA and EG are formed into a slurry, which, however, is not always indispensable. If desired, they can be directly fed to the esterification device 3. In the esterification device 3, TPA and EG are reacted preferably at from 240° to 270° C. and at from normal pressure to a pressure of 0.3 MPa, and the resulting reaction mixture is then transferred to the next esterification device 4. A polymerization catalyst and optionally a pigment are added to the reactants to be esterified. In general, such additives are dissolved or dispersed in EG and added to the esterification device.

Water as formed through the reaction in the esterification device 3 is separated from the reaction mixture in the form of an aqueous distillate along with the other low-boiling-point components through the top of a rectification tower 5, while EG which is in the form of a rectification residue is returned back to the esterification device 3 through the bottom of the rectification tower 5. The EG distillate which is formed in the esterification device 4 and which comprises water, low-boiling-point components and scattered particles of an oligomeric polyester formed therein is transferred to an EG storing tank 6. The oligomeric polyester thus formed through almost complete esterification in the esterification device 4 is transferred to the next polycondensation device.

In polycondensation devices 7, 8 and 9 as arranged in that order, the oligomer is gradually heated up to a temperature falling between 250° C. and 300° C. under a gradually-reduced pressure falling between 0.05 kPa and 30 kPa, whereby it is polycondensed to give a polyester polymer. The polycondensation devices 7, 8 and 9 are provided with wet condensers 10, 11 and 12, respectively, in which the EG distillate as formed through the reaction in the devices are condensed in these condensers and then stored in circulating EG tanks 13, 14 and 15, respectively, while a part of the EG distillate is then circulated to the respective wet condensers where the thus-circulated EG is sprayed over the EG distillate therein to condense it. Each wet condenser is connected to a vacuum source via a pipe. In this plant, the polycondensation device 9 is required to have a high vacuum degree. In order to prevent the pressure loss to be caused by the vapor pressure of the low-boiling-point component such as water to be in the EG distillate in the wet condenser 12 that is connected to the device 9 and to prevent the adhesion of the scattering particles of the oligomeric polyester to the devices and the pipes, it is desirable to add EG, which preferably has a water content of 0.3% by weight or less, to the circulating EG tank 15 at a molar ratio of from 0 to 1 relative to the raw material TPA. The overflow of the liquid in the circulating EG tank 15 is drawn out from the tank 15 whereby the liquid level in the tank 5 is kept constant. The overflow is transferred to the circulating EG tank 14, in which this is combined with the EG distillate as formed in the polycondensation device 8 and then transferred to the wet condenser 11 where it is sprayed over the EG distillate existing therein. The overflow of the liquid in the tank 14 is also drawn out from it and transferred to the circulating EG tank 13, in which this is processed in the same manner as in the tank 14. However, if the circulating EG tanks 13 and 14 connected to the wet condensers 10 and 11, respectively, are integrated into one circulating EG tank 13, the above-mentioned operation shall be conducted only once. On the other hand, if the plant comprises four or more polycondensation devices, the above-mentioned operation shall be repeated. It is desirable that the amount of the above-mentioned, low-water-content EG to be added to the circulating EG tank 15 is so controlled as to keep constant the liquid level in the circulating EG tank 13.

EG as drawn out of the circulating EG tank 13 is transferred to the EG storing tank 6 via a pump 16. If desired, the flow rate of EG is controlled via a control valve 17 in order to keep constant the liquid level in the EG storing tank 6. The EG storing tank 6 is provided with an automatic analyzer 18, with which the water content or the EG content of the liquid in the tank 6 is continuously measured. A predetermined amount of the EG distillate thus collected in the EG storing tank 6 is transferred to the slurry mixer 1 via a pump 19, at a flow rate as controlled via a control valve 20, and this is re-used in the mixer 1 as the starting material. In order to prevent any large impurities and modified polymers from being introduced into the mixer 1 from the tank 6, it is desirable to provide a filter in the pipe line between the tank 6 and the mixer 1. On the other hand, the molar ratio of EG to TPA must be kept always constant in this plant. For this, therefore, some low-water-content EG that preferably has a water content of 0.3% by weight or less will have to be added to the EG distillate to be circulated to the mixer 1, as the case may be, in order to keep a constant molar ratio of EG to TPA. In this case, the necessary amount of low-water-content EG to be added is determined on the basis of the data of the water content or the EG content as measured with the above-mentioned on-line analyzer 18, and the thus-determined amount of low-water-content EG is continuously or intermittently added to the pipe line after the pump 19 while controlling the flow rate of the low-water-content EG being added via a control valve 21. It is desirable that the most of, preferably the whole of the metallic parts to be kept in contact with EG being fed to the slurry mixer are made of stainless steel.

Next, the second aspect of the present invention will be described hereinunder with reference to FIG. 2.

Figure 2:
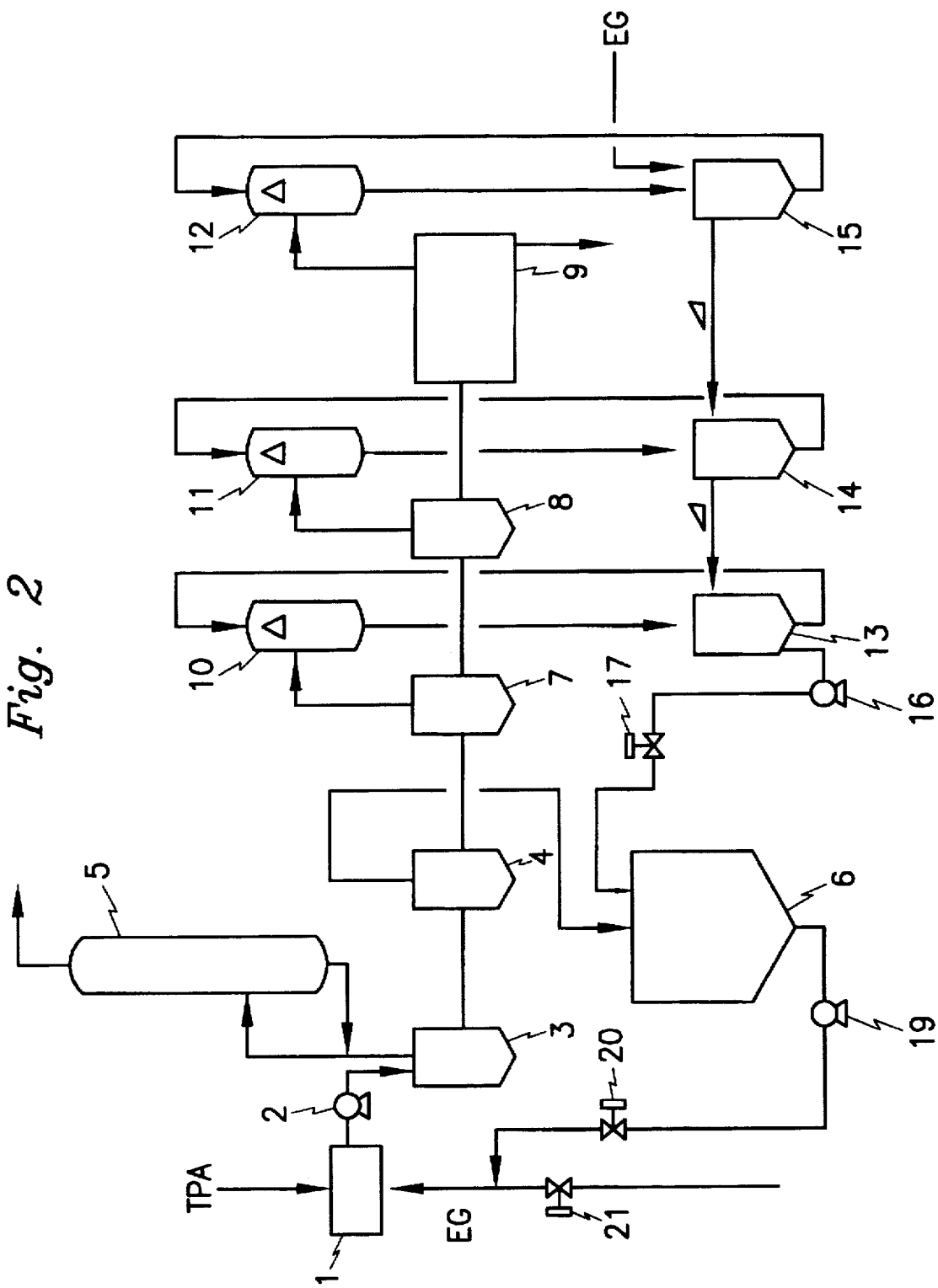
FIG. 2 is a schematic outline of one embodiment of the present invention to produce a polyester.

In FIG. 2, the individual components and their interconnection are essentially as already described in connection with FIG. 1. EG as drawn out of the circulating EG tank 13 is transferred to the EG storing tank 6 via a pump 16. If desired, the flow rate of EG is controlled via a control valve 17 in order to keep constant the liquid level in the EG storing tank 6. The EG storing tank 6 characterizes the second aspect of the present invention. This stores therein the EG distillate as collected from the previous devices, and this has a capacity corresponding to the amount of EG to be fed to the plant as the raw material for a period of 10 hours or more, preferably from 12 to 30 hours. Since the EG storing tank 6 has a capacity corresponding to the amount of EG to be fed to the plant as the raw material for a period of 10 hours or more, it is possible to keep substantially constant the content of EG and/or its ester-forming derivative in the EG distillate which is continuously collected from the previous devices and of which the amount will time-dependently vary.

A predetermined amount of the EG distillate thus collected in the EG storing tank 6 of FIG. 2 is transferred to the slurry mixer 1 via a pump 19, at a flow rate as controlled via a control valve 20, and this is re-used in the mixer 1 as the starting material. In order to prevent any large impurities and modified polymers from being introduced into the mixer 1 from the tank 6, it is desirable to provide a filter (not shown) in the pipe line between the tank 6 and the mixer 1. On the other hand, the molar ratio of EG to TPA must be kept always constant in this process. For this, therefore, some low-water-content EG that preferably has a water content of 0.3% by weight or less will have to be added to the EG distillate to be circulated to the mixer 1, as the case may be, in order to keep a constant molar ratio of EG to TPA.

In both the first aspect and the second aspect of the present invention, it is desirable that the iron content of the glycol and/or its ester-forming derivative to be recycled is 10 ppm or less, preferably 5 ppm or less, relative to the weight of terephthalic acid and/or its ester-forming derivative to be used as the other raw material, in view of the color of the polyester to be obtained.

Figure 3:
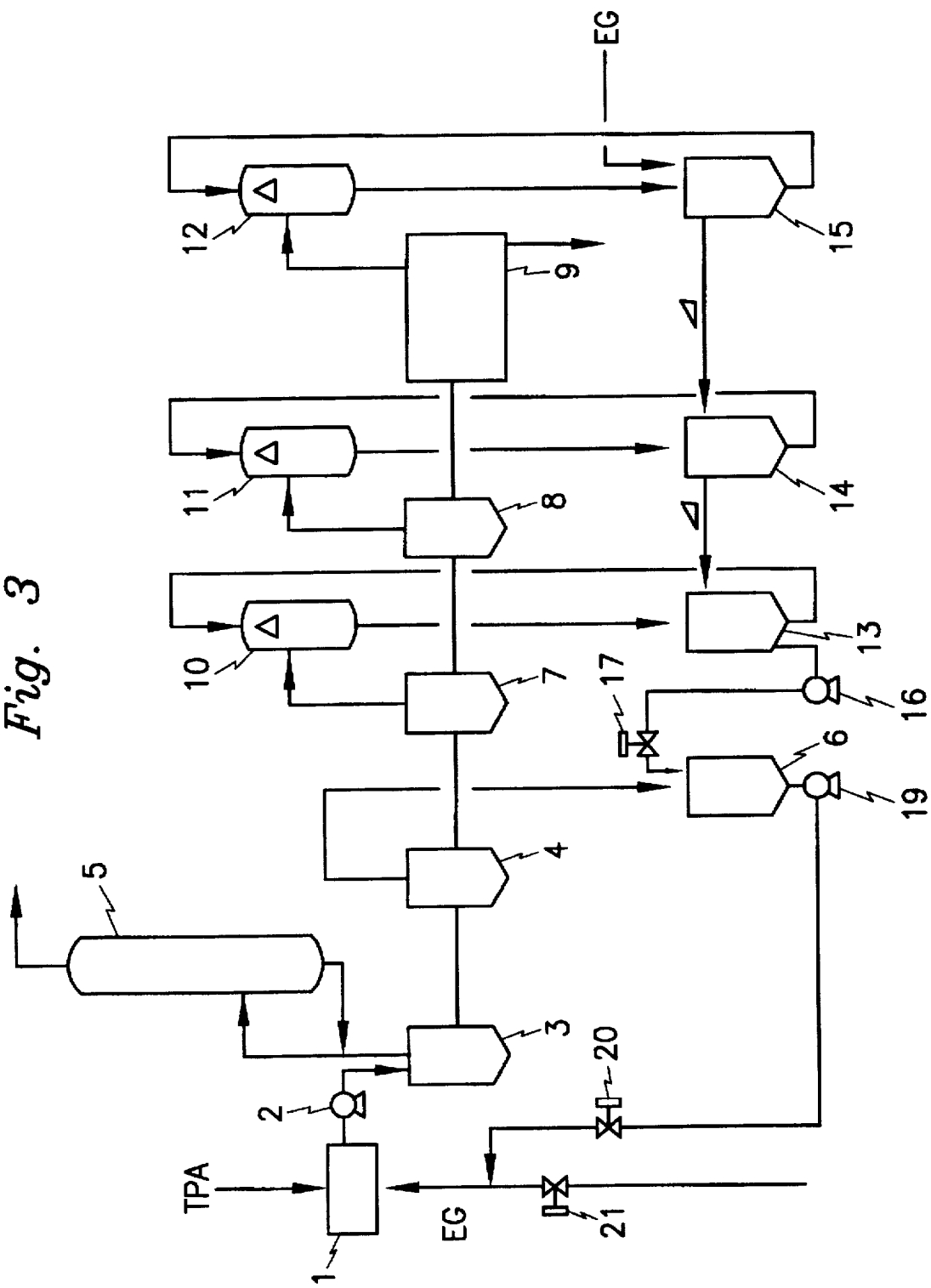
FIG. 3 is a schematic outline of a prior art process of producing a polyester.

FIG. 3 is a schematic view showing a prior art process for producing polyesters. The conventional process of FIG. 3 is not provided with an on-line analyzer such as that shown at 18 in FIG. 1. Thus, this does not include any means of measuring the pure EG content of the EG distillate formed, and is different from the first aspect of the present invention, and does not comprise any large tank capable of storing therein a large amount of the recovered distillate comprising a glycol and/or its ester-forming derivative, as in FIG. 2, and is different from the second aspect of the present invention.

Now, the present invention will be described in more detail by means of the following examples.

First Aspect of the Invention

EXAMPLE 1

The plant as illustrated in FIG. 1 was used herein, in which the metallic parts to be kept in contact with the EG distillate were made of stainless steel as entirely as possible. The pure EG content of the mixture comprising the EG distillate as formed during the process and EG as added to the circulating EG tank 15 was controlled to be always 13.8 kg/hr. Under the conditions, EG was fed to the slurry mixer 1 together with TPA of 31.1 kg/hr and formed into slurry. Then, the slurry was transferred to the esterification device 3 via the pump 2. The continuous esterification followed by polycondensation was carried out under the conditions as shown in Table 1 below. The automatic analyzer 18 used in this plant served to detect the variation in the speed of ultrasonic sound passing through different liquids that was caused by difference in density therebetween. Using the analyzer 18, the concentration of water in the EG distillate was measured. The polyester thus produced in the plant was good and had a limiting viscosity number of 0.69, a b value of 6.2 (as measured with a color machine, SM-5 Model produced by Suga Shiken-ki KK), and a DEG content of 0.75% by weight. The amount of the low-water-content EG that had been added to the circulating EG tank 15 was 11.7 kg/hr. While the process was continuously run for 1 month under the same conditions, the polyester product produced was all good and always had high and constant quality. This process did not require any EG recovering and purifying means. The polyester product produced was subjected to a yarn-spinning test, in which the yarns produced were neither problematically cut nor unevenly dyed. There was no significant difference between the yarns made from the polyester product produced herein and those made from conventional polyester products.

TABLE 1

| Reaction Conditions | Device | | | | |
|---|---|---|---|---|---|
| | Esterification Devices | | Polycondensation Devices | | |
| | Device 3 | Device 4 | Device 7 | Device 8 | Device 9 |
| Reaction Temperature (°C.) | 255 | 260 | 270 | 285 | 285 |
| Reaction Pressure (kPa) | 180 | 100 | 15 | 1.5 | 0.08 |
| Residence Time (hr) | 4.0 | 1.0 | 0.8 | 0.8 | 3.5 |
| Water Content of EG Distillate (wt. %) | — | 25 | 9 | 2 | 0.2 |

Second Aspect of the Invention

EXAMPLE 2

The process as illustrated in FIG. 2 was used herein, in which the metallic parts to be kept in contact with the EG distillate were made of stainless steel wherever possible, and the capacity of the EG storing tank 6 was 180 kg (this corresponded to the amount of the raw material EG fed to the plant for a period of 13 hours). The mixture of the EG distillate formed in the process and EG added to the circulating EG tank 15 had, at the start, an EG content of 90% by weight and a water content of 10% by weight. The EG mixture was fed to the slurry mixer 1 at a flow rate of 15.3 kg/hr (containing EG of 13.8 kg/hr) while TPA was fed thereto at a flow rate of 31.1 kg/hr, and these were formed into a slurry in the mixer and then transferred to the esterification device 3 via the pump 3.

These monomers were continuously polymerized in the subsequent devices under the conditions mentioned below. The polymerization was continued for one month to produce polyester. The amount of EG added to the circulating EG tank was 11.7 kg/hr.

Esterification Device 3: temperature of 255° C., pressure of 180 kPa, mean residence time of 4.0 hours.

Esterification Device 4: temperature of 260° C., pressure of 100 kPa, mean residence time of 1.0 hour.

Polycondensation Device 7: temperature of 270° C., pressure of 15 kPa, mean residence time of 0.8 hours.

Polycondensation Device 8: temperature of 285° C., pressure of 1.5 kPa, mean residence time of 0.8 hours.

Polycondensation Device 9: temperature of 285° C., pressure of 0.08 kPa, mean residence time of 3.5 hours.

During the continuous polymerization, the EG content of the EG mixture being fed to the slurry mixer was measured once per four hours, which was always constant.

The polyester as obtained through the continuous polymerization was all good and constantly had a limiting viscosity number of 0.71, a b value of 6.2 and a DEG content of 0.75% by weight. The polyester product produced herein was subjected to a yarn-spinning test, in which the yarns produced were neither problematically cut nor unevenly dyed.

COMPARATIVE EXAMPLE 1

The plant as illustrated in FIG. 3 was used herein, in which the metallic parts to be kept in contact with the EG distillate were made of stainless steel whenever possible. At the start of this experiment, the mixture of the EG distillate formed in the process and EG added to the circulating EG tank 15 had a pure EG content of 90%. The flow rate at the EG mixture to be fed to the slurry mixer 1 was all the time controlled at 15.3 kg/hr, while TPA of 31.1 kg/hr was fed to the mixer together with the EG mixture. The continuous esterification followed by polycondensation was carried out entirely under the same conditions as those shown in Table 1 above. Immediately after the start of the production using the process, the polyester obtained herein was good, like the polyesters obtained in the previous examples, and had a limiting viscosity number of 0.69, a b value of 6.2 and a DEG content of 0.75%. However, the quality of the polyester obtained herein varied greatly. Numerically, its b value ranged between 6.0 and 9.0 and its DEG content ranged between 0.73% by weight and 0.88% by weight. In the yarn-spinning test using the polyester obtained herein, the yarns produced were dyed unevenly. It is believed that these problems that occurred in this experiment would be caused by the failure in the control of the molar ratio of EG/TPA in the parts from which the materials to be polymerized are fed to the plant.

While the invention has been described in detail and with reference to specific embodiments thereof, it will be apparent to one skilled in the art that various changes and modifications can be made therein without departing from the spirit and scope thereof.

What is claimed is:

1. A method for producing polyesters wherein raw materials of terephthalic acid and/or its ester-forming derivative, and a glycol and/or its ester-forming derivative are fed to an esterification device where they are esterified to give an oligomeric polyester, and wherein the oligomeric polyester is transferred to a polycondensation device where it is polycondensed to give a polyester; the method comprising the steps of (a) partly or wholly recycling the distillate which is taken out from the esterification device and/or the polycondensation device and which consists essentially of a glycol and/or its ester-forming derivative, and recycling said distillate for introduction with the starting material in the method, and (b) continuously or intermittently measuring the content of at least one of water, said glycol and said ester-forming derivative in said distillate to be recycled, (c) determining the amounts of said raw materials to be fed to the intended reaction device on the basis of content thus measured, and (d) feeding the thus-determined amounts of said raw materials to the reaction device in response to the amounts thus measured.

2. The method for producing polyesters as claimed in claim 1, wherein the glycol is ethylene glycol or 1,4-butanediol.

3. The method for producing polyesters as claimed in claim 1 or 2, wherein the content of water, the glycol or its ester-forming derivative in the distillate to be recycled is measured by detecting variation in the speed of ultrasonic sound passing through said distillate.

4. A method for producing polyesters wherein raw materials of terephthalic acid and/or its ester-forming derivative, and a glycol and/or its ester-forming derivative are fed to an esterification device where they are esterified to give an oligomeric polyester, and wherein said oligomeric polyester is transferred to a polycondensation device where it is polycondensed to give a polyester; the method comprising the steps of (a) partly or wholly recycling the distillate which is taken out from said esterification device and/or said polycondensation device for introduction with the starting material in the method, said distillate consisting essentially of a glycol and/or its ester-forming derivative, (b) storing said distillate, prior to being recycled for introduction with said starting material, in a storage tank, said storage tank having a capacity to store a corresponding amount of said distillate required to feed to said esterification device for a period of 10 hours or more, and (c) feeding said distillate to the intended reaction device in a predetermined and substantially constant amount.

5. The method for producing polyesters as claimed in claim 4, wherein the glycol is ethylene glycol or 1,4-butanediol.

6. The method for producing polyesters as claimed in claim 4 or 5, wherein said storage tank has a capacity corresponding to the amount of said distillate containing glycol and/or its ester-forming derivative, to be fed to the esterification device for a period of 12 to 30 hours.

* * * * *